US012675587B2

(12) United States Patent
Weir

(10) Patent No.: US 12,675,587 B2
(45) Date of Patent: Jul. 7, 2026

(54) MAINTAINING AND DETERMINING CONFIDENTIALITY, AUTHENTICITY AND INTEGRITY OF RECORDED DATA

(71) Applicant: Ampex Data Systems Corporation, Hayward, CA (US)

(72) Inventor: Malcolm A. C. Weir, Colorado Springs, CO (US)

(73) Assignee: Ampex Data Systems Corporation, Hayward, CA (US)

( * ) Notice: Subject to any disclaimer, the term of this patent is extended or adjusted under 35 U.S.C. 154(b) by 35 days.

(21) Appl. No.: 18/510,059

(22) Filed: Nov. 15, 2023

(65) Prior Publication Data

US 2024/0163091 A1 May 16, 2024

Related U.S. Application Data

(60) Provisional application No. 63/425,788, filed on Nov. 16, 2022.

(51) Int. Cl.
  *G06F 21/60* (2013.01)
  *H04L 9/06* (2006.01)
  (Continued)

(52) U.S. Cl.
  CPC .......... *G06F 21/606* (2013.01); *H04L 9/0662* (2013.01); *H04L 9/0822* (2013.01); (Continued)

(58) Field of Classification Search
  CPC ....... H04L 9/0869; H04L 9/0825; H04L 9/14; H04L 63/068; H04L 2463/062; (Continued)

(56) References Cited

U.S. PATENT DOCUMENTS 6,052,466 A 4/2000 Wright
8,375,206 B2 * 2/2013 Asano ................... H04L 9/3273
  713/168

(Continued)

FOREIGN PATENT DOCUMENTS

EP 1624608 A1 2/2006
WO 2019231465 A1 12/2019

OTHER PUBLICATIONS

International Search Report and Written Opinion received in PCT/US2023/079807 dated Mar. 1, 2024, pp. 4.
International Written Opinion of the International Preliminary Examining Authority received in PCT/US2023/079807 dated Dec. 10, 2024, pp. 8.

(Continued)

*Primary Examiner* — Shaqueal D Wade-Wright
(74) *Attorney, Agent, or Firm* — Siritzky Law, PLLC

(57) ABSTRACT

The encryption system may include a host apparatus and a remote apparatus. The host apparatus may generate an asymmetric encryption key pair that comprises a first key and a second key. The host apparatus may deliver the first key to the remote apparatus. The remote apparatus may generate a symmetric encryption key. The remote apparatus may encrypt a key block using the first key. The encrypted key block may include the symmetric encryption key and a sequence field. The remote apparatus may record a dataset. The remote apparatus may encrypt the recorded dataset using the generated symmetric encryption key. The remote apparatus may send the recording file to the host apparatus. The host apparatus may decrypt the symmetric encryption key using the second key. The host apparatus may decrypt the encrypted dataset using the symmetric encryption key.

18 Claims, 6 Drawing Sheets

(51) Int. Cl.

| | |
|---|---|
| *H04L 9/08* | (2006.01) |
| *H04L 9/14* | (2006.01) |
| *H04L 9/40* | (2022.01) |

(52) U.S. Cl.
CPC .......... *H04L 9/0825* (2013.01); *H04L 9/0869* (2013.01); *H04L 9/0894* (2013.01); *H04L 9/14* (2013.01); *H04L 9/065* (2013.01); *H04L 63/045* (2013.01); *H04L 63/068* (2013.01); *H04L 2463/062* (2013.01)

(58) Field of Classification Search
CPC ..... H04L 9/0662; H04L 63/045; H04L 63/04; H04L 63/0428; H04L 63/0435; H04L 63/0457; H04L 63/0478; H04L 9/0822; H04L 9/0894; H04L 9/08; H04L 9/0861; H04L 9/065; G06F 21/606
See application file for complete search history.

(56) References Cited

U.S. PATENT DOCUMENTS

| | | | | |
|---|---|---|---|---|
| 8,761,007 | B1 * | 6/2014 | Damle .................... | H04L 45/18 |
| | | | | 370/254 |
| 2003/0108205 | A1 * | 6/2003 | Joyner ................. | H04L 9/0825 |
| | | | | 380/277 |
| 2015/0033014 | A1 * | 1/2015 | McGrew ............ | H04L 63/1466 |
| | | | | 713/168 |
| 2015/0363426 | A1 * | 12/2015 | Xu ........................ | G06F 16/188 |
| | | | | 707/822 |
| 2019/0020632 | A1 | 1/2019 | Leavy et al. | |
| 2019/0020647 | A1 * | 1/2019 | Sinha .................... | H04L 63/061 |
| 2020/0244448 | A1 * | 7/2020 | Binz Vallevik ......... | H04W 4/44 |

OTHER PUBLICATIONS

International Written Opinion received in PCT/US2023/079807 dated Mar. 1, 2024, pp. 9.

* cited by examiner

MAINTAINING AND DETERMINING CONFIDENTIALITY, AUTHENTICITY AND INTEGRITY OF RECORDED DATA

CROSS-REFERENCE TO RELATED APPLICATION

This application claims priority to U.S. Provisional Patent Application No. 63/425,788 filed on Nov. 16, 2022, the entire contents of which are incorporated herein by reference.

BACKGROUND

Data encryption may be used to protect digital data confidentiality as it is stored on computer systems and transmitted using the internet or other computer networks. The advanced encryption standard (AES) and/or other encryption algorithms may be used for data encryption. Data encryption provides confidentiality and drives key security initiatives including authentication, integrity, and/or non-repudiation. Authentication may enable verification of a message's origin. Integrity may provide proof that a message's contents have not changed since it was sent. Non-repudiation may ensure that a message sender cannot deny sending the message.

Data encryption typically operates as either open/unlocked or closed/locked. However, there are times where a third state is needed: the ability to write data, but not read it; this is the purpose behind the Turnstile Encryption Scheme. It may be desirable to allow a recording system to create one or more files that are securely and efficiently encrypted, while providing assurance that those files cannot be decrypted on the recording device.

SUMMARY

Systems, methods, and apparatus are described herein for an encryption scheme that includes one asymmetric algorithm and one symmetric algorithm to create encrypted files.

An encryption system may include a host apparatus and a remote apparatus. The host apparatus may generate an asymmetric encryption key pair that comprises a first key and a second key. The asymmetric encryption key pair may remain valid until the second key is compromised, the first key is disclosed beyond the remote apparatus, and/or another asymmetric encryption key pair is generated. The host apparatus may deliver the first key to the remote apparatus. The remote apparatus may generate a first symmetric encryption key. The first symmetric encryption key may be generated using a random bit generator.

The remote apparatus may encrypt a first key block using the first key. The encrypted first key block may include the first symmetric encryption key and a sequence field having a first value. The sequence field may indicate a recording order associated with the first recording file and one or more other recording files. The sequence field may be incremented by one for each successive recording file. The remote apparatus may record a first dataset. The remote apparatus may encrypt the recorded first dataset using the generated first symmetric encryption key. The remote apparatus may store the first key block and the encrypted first dataset in a first recording file. The remote apparatus may close the first recording file. The first recording file may be closed after a predetermined period of time has elapsed and/or after a predetermined amount of data is written to the first recording file.

The remote apparatus may generate a second symmetric encryption key. The second symmetric encryption key may be generated using a random bit generator. The remote apparatus may encrypt a second key block using the first key. The encrypted second key block may include the second symmetric encryption key and the sequence field having a second value. The second value of the sequence field may be greater than the first value of the sequence field. The remote apparatus may record a second dataset. The remote apparatus may encrypt the recorded second dataset using the generated second symmetric encryption key. The remote apparatus may store the second key block and the encrypted second data set in a second recording file. The remote apparatus may close the second recording file. The second recording file may be closed after the predetermined period of time has elapsed and/or after the predetermined amount of data is written to the second recording file. The remote apparatus may send the first recording file and the second recording file to the host apparatus.

The host apparatus may decrypt the first symmetric encryption key and the second symmetric encryption key using the second key. The host apparatus may decrypt the encrypted first dataset using the first symmetric encryption key and the encrypted second dataset using the second symmetric encryption key.

DETAILED DESCRIPTION

Figure 1:
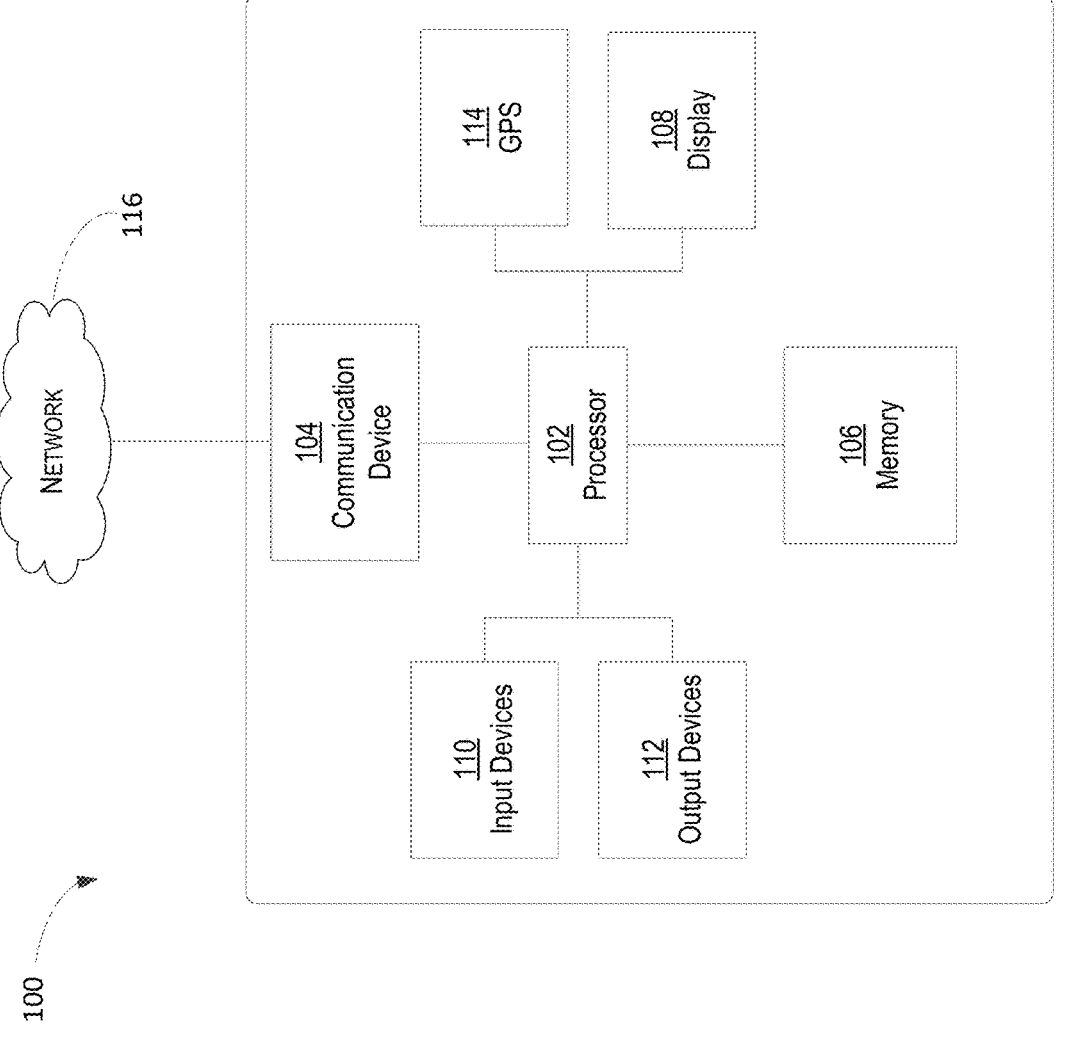
FIG. 1 illustrates a block diagram of an example computing device.

FIG. 1 illustrates a block diagram of an example computing device 100. The computing device 100 may include a personal computer, such as a laptop or desktop computer, a tablet device, a cellular phone or smartphone, a server, a video collection system, a telemetry system, a vehicle computer, a flight computer, a recorder, or another type of computing device. The computing device 100 may include a processor 102, a communication interface 104, a memory 106, a display 108, input devices 110, output devices 112, and/or a GPS circuit 114. The computing device 100 may include additional, different, or fewer components.

The processor 102 may include one or more general purpose processors, special purpose processors, conventional processors, digital signal processors (DSPs), micro-processors, integrated circuits, a programmable logic device (PLD), application specific integrated circuits (ASICs), or the like. The processor 102 may perform signal coding, data processing, image processing, power control, input/output processing, and/or any other functionality that enables the computing device 100 to perform as described herein.

The processor 102 may store information in and/or retrieve information from the memory 106. The memory 106 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory may be local memory or remote memory external to the computing device 100. The memory 106 may store instructions which are executable by the processor 102. Different information may be stored in different locations in the memory 106.

The processor 102 that may communicate with other devices via the communication device 104. The communication device 104 may transmit and/or receive information over the network 116, which may include one or more other computing devices. The communication device 104 may perform wireless and/or wired communications. The communication device 104 may include a receiver, transmitter, transceiver, or other device capable of performing wireless communications via an antenna. The communication device 104 may be capable of communicating via one or more protocols, such as a cellular communication protocol, a Wi-Fi communication protocol, Bluetooth®, a near field communication (NFC) protocol, an interne protocol, another proprietary protocol, or any other radio frequency (RF) or communications protocol. The computing device 100 may include one or more communication devices 104.

The processor 102 may be in communication with a display 108 for providing information to a user. The information may be provided via a user interface on the display 108. The information may be provided as an image generated on the display 108. The display 108 and the processor 102 may be in two-way communication, as the display 106 may include a touch-screen device capable of receiving information from a user and providing such information to the processor 102.

The processor 102 may be in communication with a GPS circuit 114 for receiving geospatial information. The processor 102 may be capable of determining the GPS coordinates of the wireless communication device 100 based on the geospatial information received from the GPS circuit 114. The geospatial information may be communicated to one or more other communication devices to identify the location of the computing device 100.

The processor 102 may be in communication with input devices 110 and/or output devices 112. The input devices 110 may include a camera, a microphone, a keyboard or other buttons or keys, and/or other types of input devices for sending information to the processor 102. For example, the camera may send images (e.g., still pictures and/or video stream(s)) to the computing device(s). The microphone may send recorded data to the processer, such as recorded audio files to the computing device(s) and/or recorded audio that is part of the video stream(s). The keyboard and/or other button(s) and/or keys may send keyboard data (e.g., keyboard strokes, hotkeys, etc.) to the computing device(s). The display 108 may be a type of input device, as the display 108 may include touch-screen sensor capable of sending information to the processor 102. The output devices 112 may include speakers, indicator lights, or other output devices capable of receiving signals from the processor 102 and providing output from the computing device 100. The display 108 may be a type of output device, as the display 108 may provide images or other visual display of information received from the processor 102.

Figure 2:
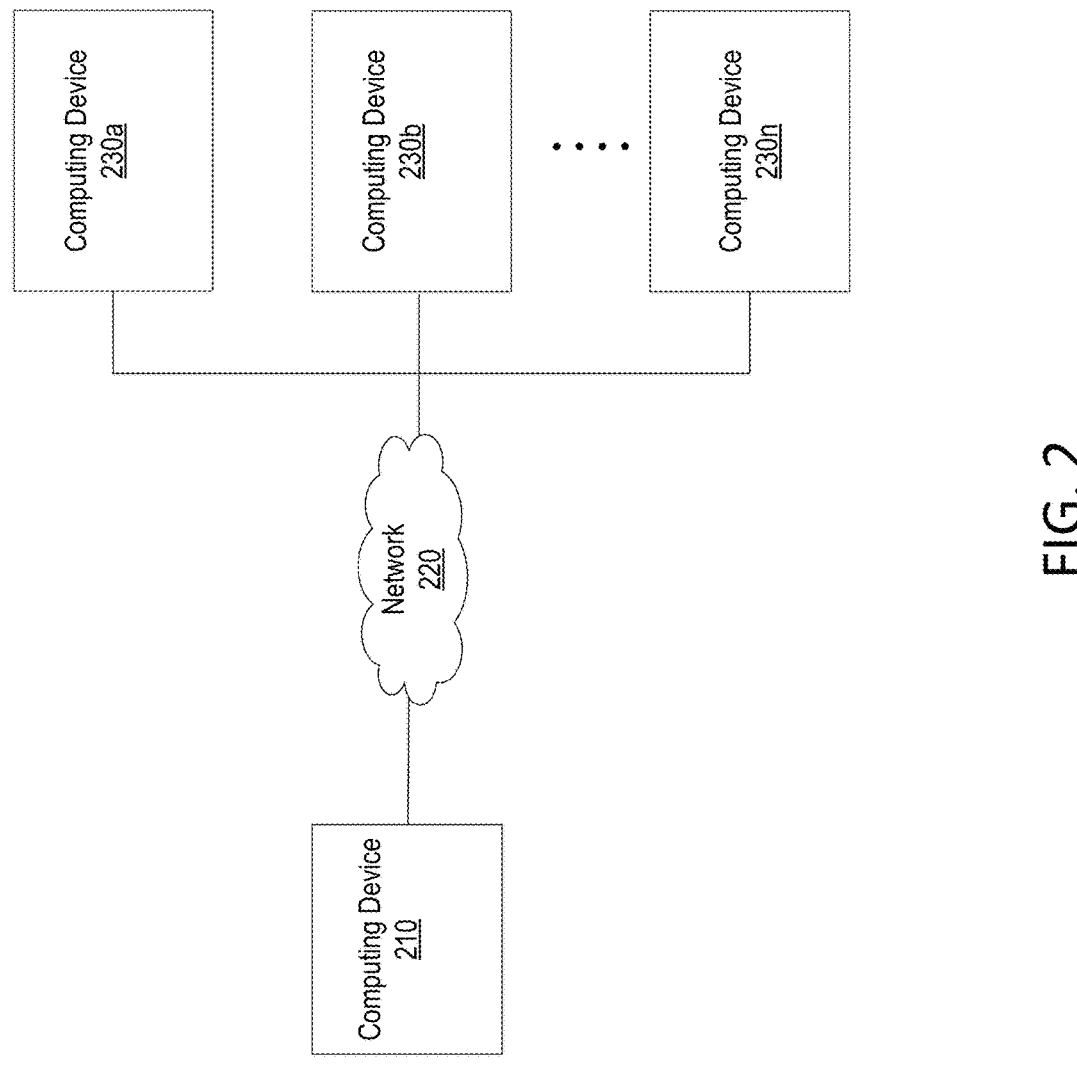
FIG. 2 illustrates a block diagram of an example computing network system.

FIG. 2 illustrates a block diagram of an example computing network system 200. The computing network system 200 may include one or more computing devices 230a-230n that may be capable of communicating digital messages with one another, either directly or via the network 220. The computing devices 230-230n may be user devices capable of logging into a session (e.g., a browsing session) of an interactive computing environment and providing real-time interactive data via the network 220. The network 220 may include a wired and/or wireless network. For example, the network 220 may include a Wi-Fi communication network, a Wi-MAX communication network, a cellular communication network (e.g., CDMA, HSPA+, LTE, etc.), and/or a television white space (TVWS) communication network. The network 220 may include one or more communication networks.

The one or more computing devices 230a-230n may be capable of communicating digital messages to and/or receiving digital messages from the computing device 210 via the network 220. The computing device 210 may be a server, such as a web server, for providing a user interface to the computing devices 230a-230n. The computing device 210 may be in communication with an application executing locally on the computing devices 230a-230n for providing a user interface at the computing devices. The display of information may be generated locally at the computing devices 230a-230n or at the computing device 210 and provided via an application (e.g., a web browser) at the computing devices 230a-230n.

One or more of the computing devices 230a-230n may be operated by an administrative user capable of configuring sessions of an interactive computing environment that may be stored at the computing device 210. The computing device operated by the administrative user may submit credentials to the computing device 210 to allow the session to be configured. The session may be accessed by the computing devices 230a-230n via the network 220.

Data encryption may be used to protect digital data confidentiality as it is stored on computer systems and transmitted using the internet or other computer networks. The advanced encryption standard (AES) and/or encryption algorithms may be used for data encryption. Data encryption provides confidentiality and drives key security initiatives including authentication, integrity, and/or non-repudiation. Authentication may enable verification of a message's origin. Integrity may provide proof that a message's contents have not changed since it was sent. Non-repudiation may ensure that a message sender cannot deny sending the message.

Data encryption typically operates as either open/unlocked or closed/locked. However, there are times where a third state is needed: the ability to write data, but not read it; this is the purpose behind the Turnstile Encryption Scheme. It may be desirable to allow a recording system to create one or more files that are securely and efficiently encrypted, while providing assurance that those files cannot be decrypted on the recording device.

Asymmetric encryption algorithms may require separate keys to encrypt and decrypt a data stream and may be computationally expensive. For example, to encrypt the same sized message takes at least 3 orders of magnitude (e.g. thousands of times) more instructions than it would take to encrypt the message with a symmetric algorithm. And asymmetric encryption algorithms are designed to work with small chunks of data, making them unsuited for bulk encryption—repeating patterns in the large output stream reveal the presence of patterns in the input data.

Figure 3:
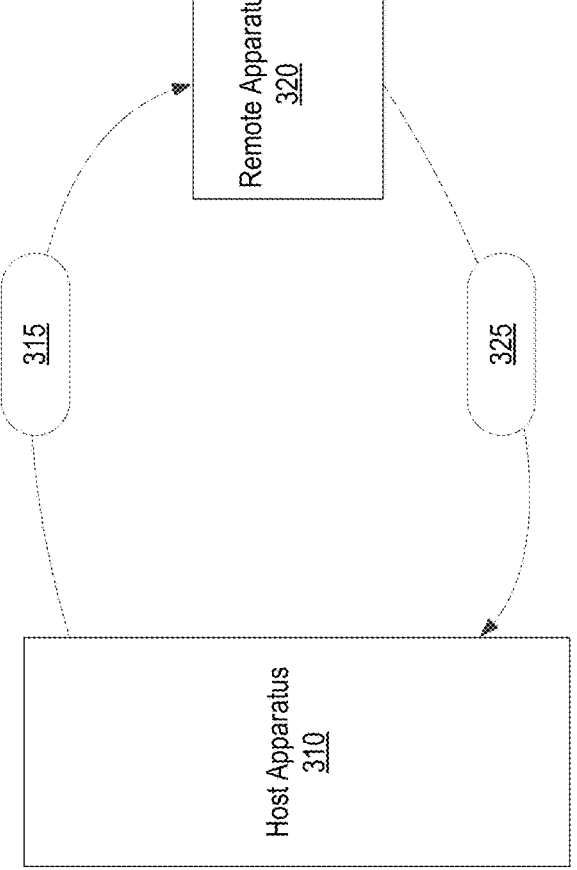
FIG. 3 is an example encryption system.

FIG. 3 is an example encryption system 300. The encryption system 300 may include a host apparatus 310 and/or a remote apparatus 320. The encryption system 300 may combine asymmetric and symmetric algorithms to create encrypted files. The encryption system 300 may use approximately the same overhead as a symmetric algorithm approach, while providing the "separate keys" property of an asymmetric algorithm.

The nature of the Scheme is designed around data collections systems that produce large sequential recording files; the most common examples are video recording systems, but any form of telemetry or instrumentation collection are also suitable. The host apparatus 310 may be a secure enclave that is considered secure from being compromised by an adversary. The host apparatus 310 may initiate and/or manage an encryption process (e.g., such as the encryption method 500 shown in FIG. 5). For example, the host apparatus 310 may be configured to decrypt and/or store the data recorded by the remote apparatus 320.

The remote apparatus 320 may be a remote enclave that is considered vulnerable to potential compromise. The remote apparatus 320 may be prevented from being able to decrypt its own recording files (e.g., and/or may be incapable of replaying video and/or analyzing data). For example, the remote apparatus 320 may not have access to the key (e.g., the asymmetric key) required to decrypt the encrypted files recorded and stored by the remote apparatus 320. Should the remote apparatus 320 be compromised, the asymmetric encryption may prevent unauthorized exposure.

The encryption system 300 may include the generation of an asymmetric key pair. The asymmetric key pair may include a first key and a second key. The first key may be a public key and may be referred to as a key encrypting key (KEK). The second key may be a private key and may be referred to as a key decrypting key (KDK). The host apparatus 310 may deliver the first key to the remote apparatus 320. For example, the host apparatus 310 may send a message 315 to the remote apparatus 320. The message 315 may indicate the first key. The remote apparatus 320 may use the first key to encrypt data, as described herein. For example, the remote apparatus 320 may generate a symmetric encryption key to encrypt data recorded by the remote apparatus 320. The remote apparatus 320 may use the first key to encrypt the symmetric encryption key within a file with the encrypted data.

The combination of the first key and second key may be referred to as the asymmetric key pair. The asymmetric key pair may be generated using an asymmetric encryption algorithm, for example, such as an Elliptic-Curve Cryptography (ECC) encryption algorithm and/or a Rivest-Shamir-Adleman (RSA) encryption algorithm. The symmetric encryption algorithm may include the advanced encryption standard (AES) encryption algorithm. The asymmetric key pair may be valid for a session. A session may run from key generation until one or more of the following occur: the second key is compromised, the first key is disclosed beyond the remote apparatus 320 and the use case is sensitive to counterfeit data recordings, and/or another asymmetric key pair is generated (e.g., for policy and/or procedural reasons). The first key (e.g., the public key) may be more closely-held than the name suggests and may not be truly public, and/or the first key may be more closely-held than the second key. The first key may be transferred to the remote apparatus 320, for example, by using a trusted and/or secure method. The second key (e.g., the private key) may remain confidential and/or may be entirely isolated to the host apparatus 310.

Some encryption algorithms (e.g., such as asymmetric encryption algorithms) may include additional keying items beyond the private key (e.g., the data encrypting key (DEK)). Some encryption algorithms may include a security element to be used as an initialization vector (IV) and/or a nonce. If the symmetric algorithm includes an IV and/or a nonce, the IV/nonce may be generated and/or securely distributed to one or more (e.g., all) systems included (e.g., to all the systems in each apparatus). Should the security element become compromised, the encryption system 300 may be restored, for example, by distributing another IV and/or nonce.

The host apparatus 310 may send a length field to the remote apparatus 320 and/or one or more other remote apparatuses. The length field may be based on an expected ciphertext output length of a selected asymmetric encryption algorithm and/or the key length being used. The output length may be determined by based on the length of the key (e.g., an encrypted message using the RSA algorithm with a 4096-bit key may be 4096 bits/512 bytes long). The output length may be defined separately from the key length. The length field may be configured during an initial configuration of the encryption system 300. The length field may be the same and/or known by one or more of the host apparatus 310 or the remote apparatus 320.

The remote apparatus 320 may send encrypted data 325 to the host apparatus 310. The encrypted data 325 may be sent as a series of recording files. Each recording file in the series of recording files may be encrypted using the symmetric encryption key and the first key (e.g., a "public" asymmetric encryption key). The host apparatus 310 may decrypt the encrypted data 325 using the second key (e.g., a private asymmetric encryption key).

Figure 4:
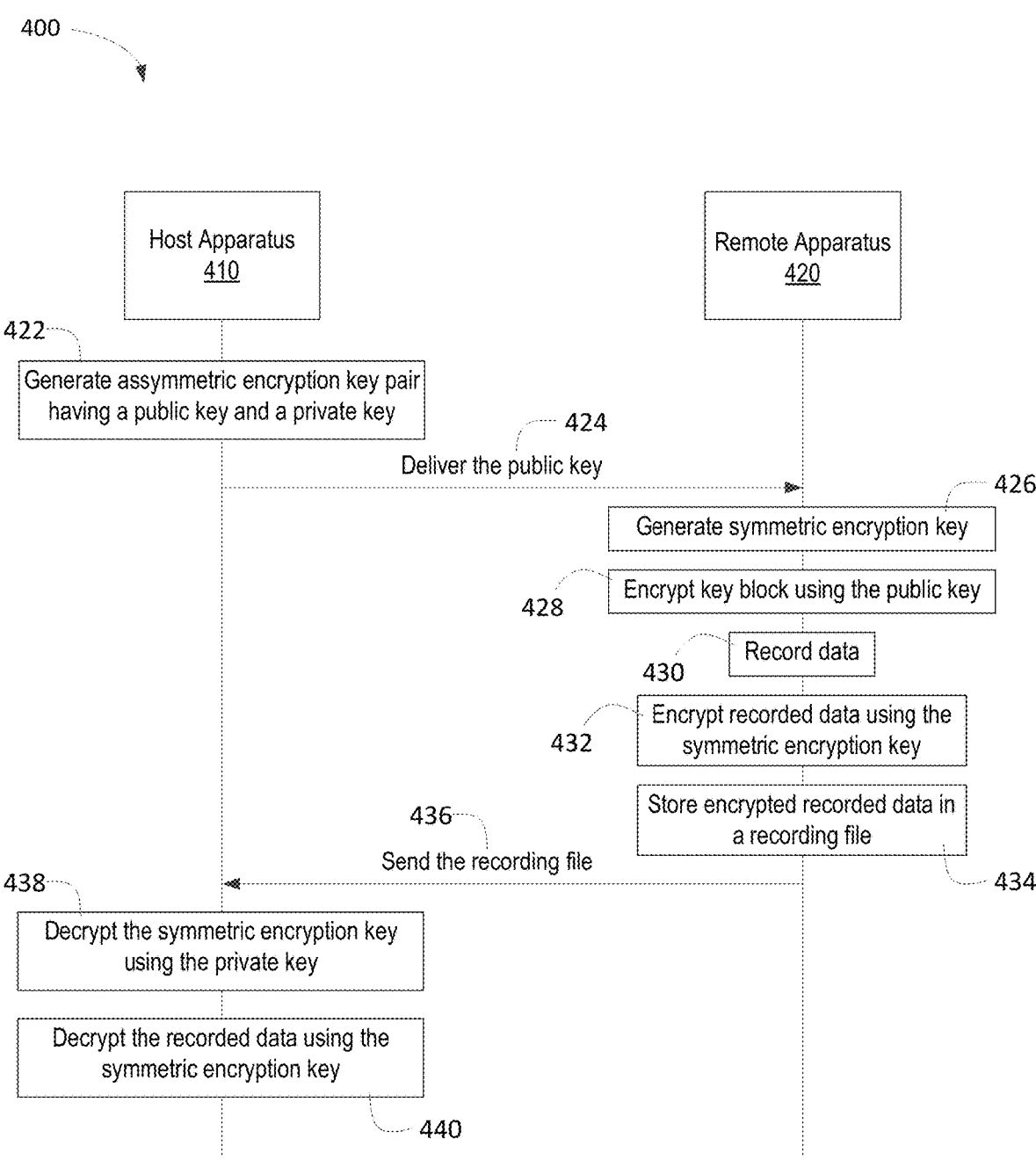
FIG. 4 is a diagram illustrating an example call flow performed by the example encryption system of FIG. 3.

FIG. 4 is a diagram illustrating an example call flow process 400 performed by an encryption system (e.g., such as the example encryption system 300 shown in FIG. 3). The process 400 may combine asymmetric and symmetric algorithms to create encrypted files with roughly the same overhead as a symmetric encryption (e.g., symmetric-only encryption) approach, while providing the additional security that the separate keys an asymmetric algorithm provide. The process 400, or portions thereof, may be performed to prevent unauthorized access of the recorded data at a recording device (e.g., such as the remote apparatus 320 shown in FIG. 3). For example, the process 400, or portions thereof, may be performed to enable recording symmetrically encrypted recorded data and the encryption key for decrypting the symmetrically encrypted recorded data is encrypted using asymmetric encryption. The process 400, or portions thereof, may be performed at two computing devices or may be distributed across more than two computing devices (e.g., multiple servers and/or a user device). The process 400, or portions thereof, may be performed to prevent unauthorized disclosure of recorded data. The process 400 may comprise instructions that may be stored in memory as computer-readable or machine-readable storage media that may be executed by the one or more computing devices for executing the process 400. For example, the process 400 may be executed by one or more processors executing computer-readable or machine-readable instructions stored in memory at the one or more computing devices.

At 422, a host apparatus 410 (e.g., such as the host apparatus 310 shown in FIG. 3) may generate an asymmetric encryption key pair. The asymmetric encryption key pair may include a public key and/or a private key.

At 424, the host apparatus 410 may deliver (e.g., send) the public key to the remote apparatus 420. For example, the host apparatus 410 may send, at 424, a message to the remote apparatus 420 that includes the public key. The message that includes the public key may be a secure and/or trusted message. The message that includes the public key may be sent, at 424, via a communications protocol, via an electronic mail, and/or the like. For example, the public key may be delivered to the remote apparatus by sending via electronic mail and/or a communications protocol. Additionally or alternatively, the public key may be delivered, at 424, to the remote apparatus 420 via a storage media such as a hard disk (e.g., such as a USB thumb drive). Additionally or alternatively, the public key may be delivered, at 424, to the remote apparatus 420 via manual operation of a keyboard at the remote apparatus 420 or scanning the public key using a barcode reader device at the remote apparatus 420.

At 426, the remote apparatus 420 may generate a symmetric encryption key for a recording file. The symmetric encryption key may be referred to as a data encryption key (DEK), for example, such as an ephemeral DEK. The remote apparatus 420 may generate, at 426, the symmetric encryption key using a random number generation process. The random number generation process may include a true random bit generator (TRBG) and/or a deterministic random bit generator (DRBG). The random generation process may conform to National Institute of Standards and Technology (NIST) SP800-90 or another random number generator standard. The size of the key used for the symmetric encryption key may impact the selection of the specific asymmetric algorithm and parameters (e.g., the asymmetric encryption key pair). The asymmetric algorithm must be suitable for encrypting a symmetric encryption key and a small amount of additional data. In examples, a 256 bit symmetric encryption key may require a 512 bit asymmetric encryption key.

At 428, the remote apparatus 420 may encrypt a key block, for example, using the public key received at 424. The key block may be referred to as an encrypted key control block (EKCB). The key block may comprise the symmetric encryption key generated at 426, a sequence field, and/or random padding. The sequence field may indicate a recording order of the recording file. For example, the sequence field may indicate a place of the recording file in the recording order of a plurality of recording files. The remote apparatus 420 may increment the sequence field for each successive recording file created by the remote apparatus 420. The random padding may be added such that the length of the key block matches a pre-configured length of data in the recording file.

At 430, the remote apparatus 420 may record data. The data may comprise one or more of image data, audio data, flight data, metadata, keyboard data, other forms of time series data, etc. The recorded data may be written to the recording file. The recorded data may be written to the recording file until a predetermined period of time has elapsed and/or until a predetermined amount of data is written to the recording file. For example, the recording file may be closed after the predetermined period of time has elapsed, after the predetermined amount of data is written to the recording file, upon completion of a mission, and/or upon the remote apparatus 420 powering off (e.g., shutting down). When the recording file is closed, another (e.g., new) recording file may be opened, for example, upon the remote apparatus 420 powering back on.

At 432, the remote apparatus 420 may encrypt the recorded data, for example, using the symmetric encryption key. The remote apparatus 420 may store, at 434, the encrypted recorded data in the recording file.

At 436, the remote apparatus 420 may send the encrypted recording file to the host apparatus 410. The host apparatus 410 may decrypt, at 438, the symmetric encryption key, for example, by using the private key. For example, the host apparatus 410 may decrypt the key block using the private key. The host apparatus 410 may decrypt, at 440, the recorded data, for example, using the symmetric encryption key.

Figure 5:
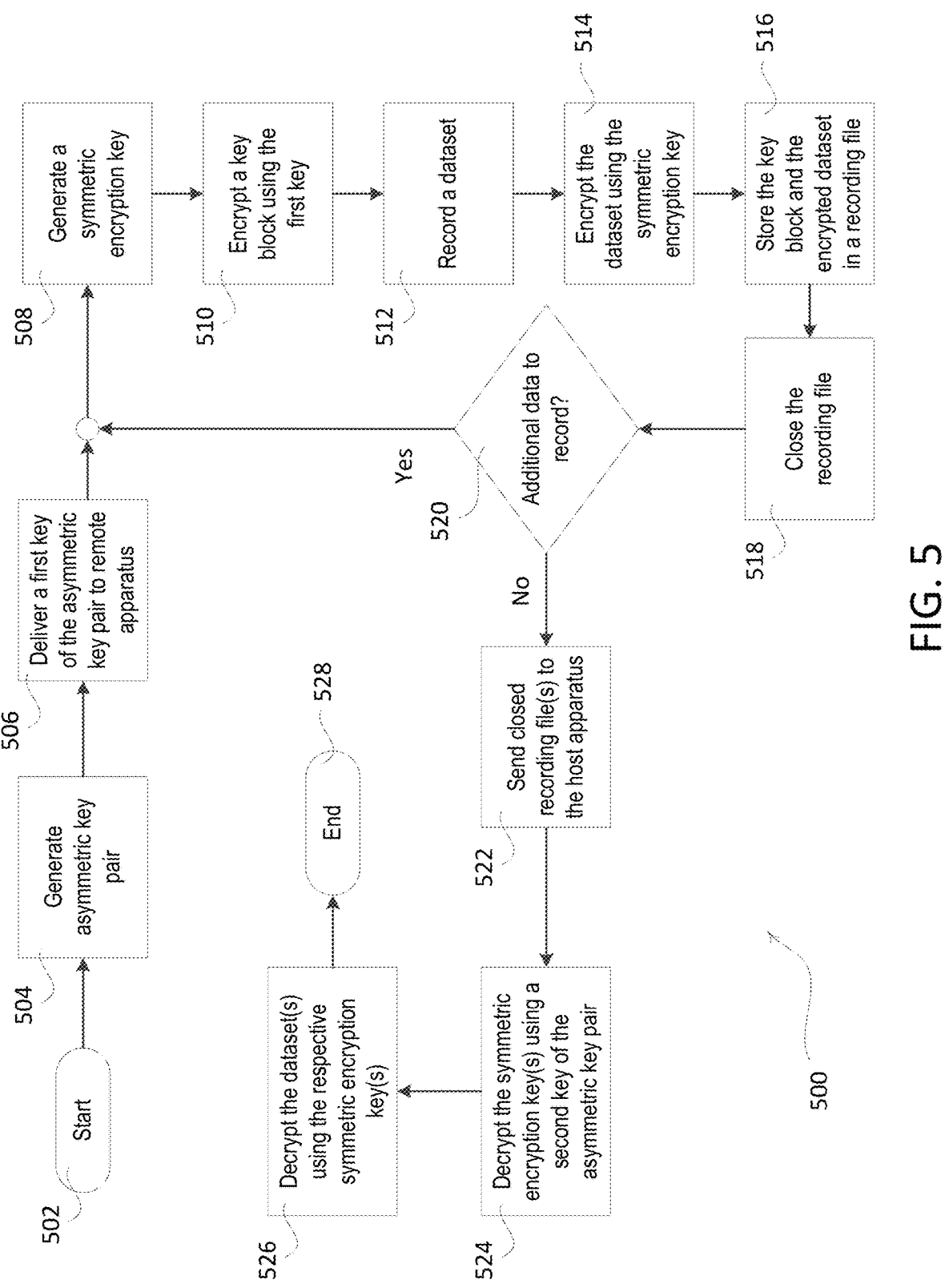
FIG. 5 is a flow diagram illustrating an example method that may be implemented by the example encryption system of FIG. 3 to encrypt recorded data using symmetric encryption and asymmetric encryption.

FIG. 5 is a flow diagram illustrating an example encryption method 500 that may be implemented by an encryption system (e.g., such as the example encryption system 300 shown in FIG. 3). The encryption method 500 may be used to encrypt recorded data using symmetric encryption and asymmetric encryption. Asymmetric encryption algorithms which require separate keys to encrypt and decrypt data, are computationally expensive. For example, to encrypt the same sized message takes at least 3 orders of magnitude (e.g., thousands of times) more instructions than it would take to encrypt the message with a symmetric algorithm. And, asymmetric algorithms may be designed to work with small chunks of data, making asymmetric algorithms unsuited for bulk encryption. Repeating patterns in the large output data may reveal the presence of patterns in the input data.

The encryption method 500 may combine asymmetric and symmetric algorithms to create encrypted files with roughly the same overhead as a symmetric encryption (e.g., symmetric-only encryption) approach, while providing the additional security that the separate keys an asymmetric algorithm provide. The encryption method 500, or portions thereof, may be performed to prevent unauthorized access of the recorded data at a recording device (e.g., such as the remote apparatus 320 shown in FIG. 3). For example, the method 500, or portions thereof, may be performed to enable recording symmetrically encrypted recorded data and the encryption key for decrypting the symmetrically encrypted recorded data is encrypted using asymmetric encryption. The method 500, or portions thereof, may be performed at two computing devices or may be distributed across more than two computing devices (e.g., multiple servers and/or a user device). The method 500, or portions thereof, may be performed to prevent unauthorized disclosure of recorded data. The method 500 may comprise instructions that may be stored in memory as computer-readable or machine-readable storage media that may be executed by the one or more computing devices for executing the method 500. For example, the method 500 may be executed by one or more processors executing computer-readable or machine-readable instructions stored in memory at the one or more computing devices. The method 500, or portions thereof, may improve the functionality of a computer network system (e.g., such as the computing network system 200 shown in FIG. 2) associated with transferring recorded data. In addition, the method 500, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s).

The method 500 may start at 502, for example, when the host apparatus initializes an encryption session. At 504, the host apparatus may generate an asymmetric encryption key pair. The asymmetric key pair may comprise a first key and a second key. The first key may be a public key that is configured to be sent to one or more remote apparatuses. The second key may be a private key that is configured to remain isolated on the host apparatus. The first key may be configured to be used to encrypt data. The second key may be configured to be used to decrypt data encrypted using the first key. For example, data encrypted using the first key may be unable to be decrypted using the first key. The asymmetric encryption key pair may remain valid until the second key is compromised, the first key is disclosed beyond the remote apparatus, and/or another asymmetric encryption key pair is generated.

At 506, the host apparatus may send (e.g., deliver) the first key to the remote apparatus. For example, the host apparatus may send, at 506, a message (e.g., a trusted or secure message) to the remote apparatus that includes the first key. The message may be sent, at 506, via a communications protocol, via an electronic mail, and/or the like. For example, the first key may be delivered, at 506, to the remote apparatus by sending via electronic mail and/or a communications protocol or providing the first key via a storage media such as a hard disk (e.g., such as a USB thumb drive). Additionally or alternatively, the first key may be delivered, at 506, to the remote apparatus via entering the first key manually via a keyboard or scanning the first key using a barcode reader device at the remote apparatus. At 508, the remote apparatus may generate a symmetric encryption key, as described herein. For example, the remote apparatus may generate, at 508, the symmetric encryption key in response to receipt of the first key of the asymmetric key pair. The symmetric encryption key may be generated using a random bit generator.

At 510, the remote apparatus may encrypt a key block using the first key. The encrypted first key block may comprise the symmetric encryption key, a sequence field having a first value, and/or random padding. The sequence field may indicate a recording order associated with the first recording file and the second recording file. At 512, the remote apparatus may record a dataset. The dataset may comprise one or more of image data, audio data, flight data, metadata, keyboard data, etc.

At 514, the remote apparatus may encrypt the recorded dataset using the generated symmetric encryption key. At 516, the remote apparatus may store the key block and the encrypted dataset in a recording file. At 518, the remote apparatus may close the recording file. The recording file may be closed, at 518, for example, after a predetermined period of time has elapsed, after a predetermined amount of data has been written to the recording file, upon completion of a mission, and/or upon the remote apparatus powering off (e.g., shutting down). Additionally or alternatively, the remote apparatus may close, at 518, the recording file upon receipt of a user input. For example, a user of the remote apparatus may choose to close, at 518, the recording file. The remote apparatus may open a recording file (e.g., a new recording file) upon powering on (e.g., after the powering off that closed the previous recording file).

At 520, the remote apparatus may determine whether there is additional data to record. For example, the remote apparatus may determine, at 520, whether the remote apparatus is still recording data. When the remote apparatus determines, at 520, that there is additional data to record, the method may return to 508 to generate another symmetric encryption key (e.g., a second symmetric encryption key) for another recording file (e.g., a second recording file). The remote apparatus may increment the sequence field for each successive recording file (e.g., such as the second recording file). For example, a second value of the sequence field for the second recording file may be greater than the first value of the sequence field for the first recording file.

When the remote apparatus determines, at 520, that there is no additional data to record, the remote apparatus may send, at 522, recording file(s) (e.g., one or more closed recording files) to the host apparatus. In examples, the remote apparatus may acquire and record, at 512, a portion of a digital video signal from a camera, and repeat the cycle from 520 to 512 so as to produce a plurality of files representing a complete video sequence. In examples, the remote apparatus may acquire and record, at 512, a stream of health and maintenance data of a vehicle.

At 524, the host apparatus may decrypt the symmetric encryption key(s) using the second key. At 526, the host apparatus may decrypt the encrypted dataset(s) using a respective symmetric encryption key. The method 500 may end at 528.

Figure 6:
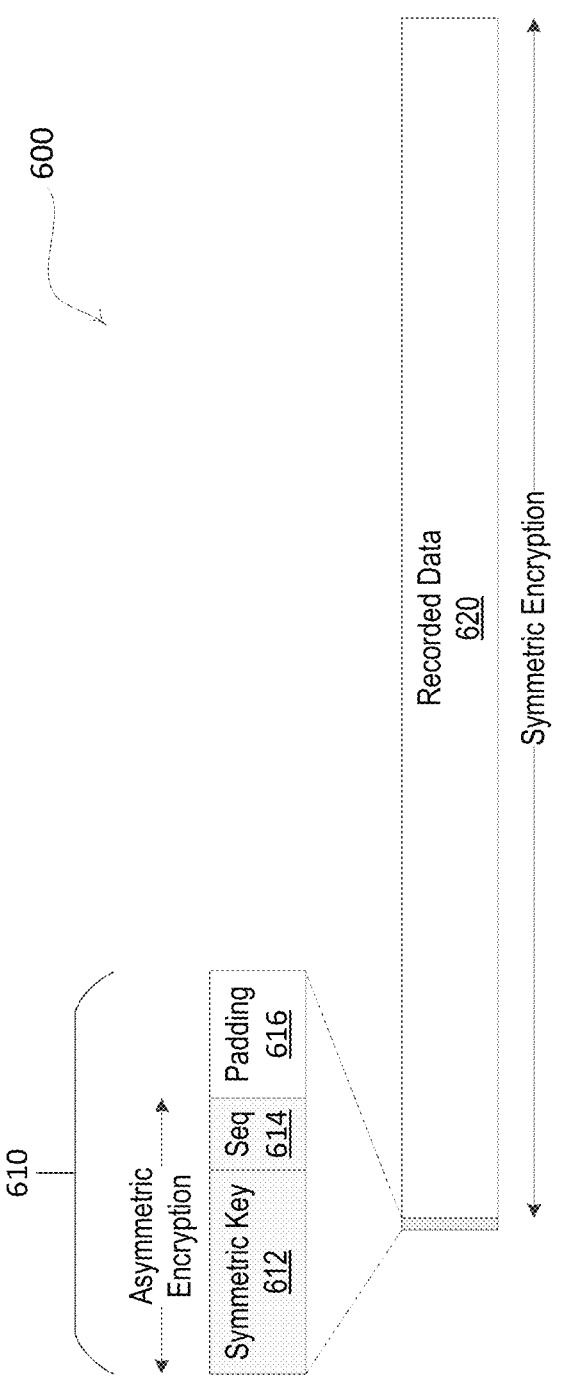
FIG. 6 is a diagram illustrating an example recording file generated by the example encryption system of FIG. 3.

FIG. 6 is a diagram illustrating an example recording file 600 generated by a remote apparatus (e.g., such as the remote apparatus 320 shown in FIG. 3). The remote apparatus may generate a random number, for example, as part of an initialization procedure. The random number may be used for the sequence field 614. The sequence field 614 may increment from the generated random number to a highest possible value to zero. In examples, the size of the sequence field 614 may be 16, 32 or 64 bits. The random number may be generated by a True Random Bit Generator (TRBG) and/or a Deterministic Random Bit Generator (DRBG) method and/or a combination of the TRBG and DRBG methods, as conforming to an appropriate standard, such as NIST SP800-90.

The file creation process for the recording file 600 creation may include generation of a symmetric encryption key 612 (e.g., an Ephemeral data encryption key (DEK)). The symmetric encryption key 612 may be created by the DRBG. The remote apparatus may generate a key block 610 that includes the sequence field 614, the symmetric encryption key 612, and padding 616. The key block 610 may be an encryption key control block (EKCB). The remote apparatus may encrypt the symmetric encryption key 612 and the sequence field 614 using an asymmetric encryption key (e.g., the public key). The remote apparatus may include padding 616 to the key block 610. The padding 616 may be a random padding with random data to match a pre-configured data length.

The remote apparatus may write the key block 610 to the recording file 600, for example, at the beginning of the recording file 600. The remote apparatus may then write recorded data 620 to the recording file 600. The remote apparatus may encrypt the recorded data 620 using the symmetric encryption key 612. If the symmetric encryption key 612 (e.g., the symmetric encryption algorithm used for the symmetric encryption key 612) includes an IV/nonce, the IV distributed to one or more (e.g., all) systems may be used.

While the recording file 600 is open and/or being written to, the specific symmetric encryption key 612 being used for the recording file may be accessible to an attacker that can access to one or more (e.g., all) of the recording system's memory (e.g., if the system is already compromised). However, when the recording file 600 is closed, the symmetric encryption key 612 may be purged (e.g., over-written and/or the memory used released). The closed recording file 600 may be locked, and/or the recorder/data collection system may not be able to decrypt any of the data in the closed recording file 600.

The remote apparatus may periodically close and/or reopen the recording file 600, for example, to maintain security. For example, the recording file 600 may be closed after a predetermined time (e.g., such as two minutes) and/or after a predetermined amount (e.g., such as one gigabyte) of data is written. The recording file 600 may be closed after the completion of a mission, in response to a user input, and/or upon the remote apparatus powering off (e.g., shutting down). When the recording file 600 is closed, the remote apparatus may generate another recording file with another symmetric encryption key. The remote apparatus may increment (e.g., by one) the sequence field 614 for each subsequent recording file.

The remote apparatus may send the closed recording files to the home apparatus. Once within the home apparatus, the key block 610 may be read, stripped of the padding and/or decrypted using the private key of the asymmetric key pair that was previously generated by the home apparatus. For example, the host apparatus may identify the symmetric encryption key 612 and/or the sequence field 614. The host apparatus may use the sequence field 614 to determine when the encryption scheme (e.g., the symmetric encryption key 612) in the remote apparatus was restarted. For example, on initialization, a random value for the sequence field 614 may be generated, which is then incremented for each subsequent recording file. A change in value of the sequence field 614 for recording files may indicate that the recorder was restarted. The home apparatus may decrypt the recording file 600 may be decrypted using the decrypted symmetric encryption key 612 and/or the IV/nonce.

Although the figures show the key block (e.g., such as key block 610 shown in FIG. 6) as part of the recording file that comprises recorded data, it should be appreciated that the key block may be additionally or alternatively written to a separate file from the recording file. In this approach, the recording file can be decrypted and processed "on the fly" by applications that include the capability of decrypting the relevant symmetric encryption scheme. The key block files may be stored separately from the recording files, for example, as an additional level of security. Without the key block files, the recording files are protected even within the home apparatus.

When the recording data includes streaming data, the key block may be segregated from the streaming data, for example, using either in-band flags and/or using an out-of-band system where the key block data is sent on one channel and the streaming data is sent on another channel. In examples, a first flag (e.g., flag "0") may indicate that the following chunk of data is streaming data and a second flat (e.g., flag "1") may indicate that the following chunk of data is a key block. Flags and/or delimiters may be used to signal when the streaming data symmetric encryption keys (e.g., DEKs) must be changed.

The encryption systems described herein may be used with files having a recognized format, for example a video format like the MPEG Transport Stream. For example, the key block may be stored in an appropriate section of the format (e.g., as a "KLV" metadata parameter), with only the bulk video (and associated user metadata) being encrypted with the symmetric encryption key. The key block may be signaled in metadata when there is an existing method for transporting files of that type from the remote apparatus.

The encryption systems described herein may facilitate telemetry and/or broadcast from one of a group of systems in a remote apparatus back to the home apparatus. Instead of each of the remote group's systems having to be keyed alike or immediately before use, the systems can be keyed with the public key well in advance and any one of the remote apparatus's systems can be used without any additional setup, as they all share the same public key.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A method comprising:

at a remote apparatus:

(A) obtaining a key-encrypting key, the key-encrypting key being a first key of an asymmetric key pair;

(B) generating a symmetric encryption key;

(C) determining a key control block, the key control block comprising the symmetric encryption key and a sequence field;

(D) encrypting the key control block using the key-encrypting key to form an encrypted key control block;

(E) storing the encrypted key control block in a recording file;

(F) storing an encrypted dataset in the recording file, wherein the encrypted dataset comprises a dataset encrypted using the symmetric encryption key; and (G) repeating act (F) until: (i) a predetermined time has elapsed since the recording file was opened, or (ii) a predetermined amount of data has been written to the recording file, and then (H) closing the recording file and purging the symmetric encryption key; and then (I) repeating acts (B) to (H) at least once, wherein, in step (I):

(x) a repetition of step (B) generates another symmetric encryption key, and (y) repetition of step (C) uses the other symmetric encryption key and another sequence field, distinct from a previous sequence field, and (z) a repetition of step (E) uses another recording file, distinct from a previous recording file, wherein a value of an initial sequence field is randomly generated by the remote apparatus, and wherein the remote apparatus increments the sequence field for each successive recording file created by the remote apparatus, and wherein the sequence field indicates a place of the recording file in a recording order of a plurality of recording files, and wherein the remote apparatus sends a series of multiple recording files to a host apparatus, and wherein a plurality of sequence fields of a corresponding plurality of key control blocks of a plurality of recording files is used to determine if the remote apparatus was restarted, and wherein data in the dataset comprise one or more of: video data, telemetry data, instrumentation data, image data, audio data, flight data, metadata, keyboard data, and other forms of time series data, and wherein a recording file is closed upon the remote apparatus powering off, and wherein the method further comprises, upon the remote apparatus powering on:

forming a new encrypted key control block by: step (B) generating a new symmetric encryption key, and step (C) determining a new key control block, comprising the new symmetric encryption key and a new sequence field, and step (D) encrypting the new key control block using the key-encrypting key to form the new encrypted key control block.

2. The method of claim 1, wherein a second key of the asymmetric key pair is required to decrypt data encrypted with the first key, and wherein the remote apparatus does not have access to the second key.

3. The method of claim 1, wherein the remote apparatus does not have access to a key required to decrypt the encrypted key control block or any data encrypted with the first key.

4. The method of claim 1, wherein the remote apparatus does not have access to the symmetric encryption key used to encrypt the encrypted dataset in a closed recording file.

5. The method of claim 1, wherein the first key was provided to the remote apparatus by the host apparatus.

6. The method of claim 5, wherein the asymmetric key pair was generated at the host apparatus, and wherein the asymmetric key pair is valid from key generation until one or more of the following occur:
  (i) a second key of the asymmetric key pair is compromised, where the second key is required to decrypt data encrypted with the first key, or
  (ii) the first key is disclosed beyond the remote apparatus, or
  (iii) another asymmetric key pair is generated.

7. A non-transitory computer-readable storage medium storing one or more programs configured to be executed by one or more processors of a computer system, the one or more programs including instructions for performing the method of claim 1.

8. A device comprising:
  one or more processors; and memory storing one or more programs configured to be executed by the one or more processors, the one or more programs including instructions for performing the method of claim 1.

9. A system comprising:
  (X) at least one device having one or more processors; and memory storing one or more programs configured to be executed by the one or more processors, the one or more programs including instructions for performing the method of claim 1; and
  (Y) the host apparatus comprising at least one processor configured to:
    (p) generate an asymmetric encryption key pair that comprises a first key and a second key; and
    (q) deliver the first key to the at least one device.

10. The system of claim 9, wherein the host apparatus is further configured to:
  repeat acts (p) and (q) for a new asymmetric encryption key pair for policy or procedural reasons or when it is determined that:
    (i) a second key of the asymmetric key pair is compromised, or
    (ii) the first key is disclosed beyond a remote apparatus.

11. The system of claim 10, wherein the host apparatus is further configured to:
  decrypt key control blocks from recorded files received from a remote apparatus; and
  use sequence fields from decrypted key control blocks to determine integrity of recording files.

12. A device comprising:
  hardware, including one or more processors configured to, at a remote apparatus:
    (A) obtain a key-encrypting key, the key-encrypting key being a first key of an asymmetric key pair;
    (B) generate a symmetric encryption key;

(C) determine a key control block, the key control block comprising the symmetric encryption key and a sequence field;
  (D) encrypt the key control block using the key-encrypting key to form an encrypted key control block;
  (E) store the encrypted key control block in a recording file;
  (F) store an encrypted dataset in the recording file, wherein the encrypted dataset comprises a dataset encrypted using the symmetric encryption key; and
  (G) repeat (F) until (i) a predetermined time has elapsed since the recording file was opened, or (ii) a predetermined amount of data has been written to the recording file, and then
  (H) close the recording file and purge the symmetric encryption key; and
  (I) repeat (B) to (H) at least once,
  wherein, in step (I):
    (x) a repetition of (B) generates another symmetric encryption key, and
    (y) a repetition of (C) uses the other symmetric encryption key and another sequence field, distinct from a previous sequence field, and
    (z) a repetition of (E) uses another recording file, distinct from a previous recording file,
  wherein a value of an initial sequence field is randomly generated by the remote apparatus, and wherein the remote apparatus increments the sequence field for each successive recording file created by the remote apparatus, and
  wherein the sequence field indicates a place of the recording file in a recording order of a plurality of recording files, and
  wherein the remote apparatus sends a series of multiple recording files to a host apparatus, and
  wherein a plurality of sequence fields of a corresponding plurality of key control blocks of a plurality of recording files is used to determine if the remote apparatus was restarted, and
  wherein data in the dataset comprise one or more of: video data, telemetry data, instrumentation data, image data, audio data, flight data, metadata, keyboard data, and other forms of time series data,
  wherein the one or more processors are further configured to, upon the remote apparatus powering on:
  form a new encrypted key control block by (B) generating a new symmetric encryption key, and (C) determining a new key control block, comprising the new symmetric encryption key and a new sequence field, and (D) encrypting the new key control block using the key-encrypting key to form the new encrypted key control block, and
  wherein the recording file is closed upon the remote apparatus powering off.

13. The device of claim 12, wherein a second key of the asymmetric key pair is required to decrypt data encrypted with the first key, and the remote apparatus does not have access to the second key.

14. The device of claim 12, wherein the remote apparatus does not have access to a key required to decrypt the encrypted key control block or any data encrypted with the first key.

15. The device of claim 12, wherein the remote apparatus does not have access to the symmetric encryption key used to encrypt the encrypted dataset in a closed recording file.

16. The device of claim 12, wherein the asymmetric key pair is valid from key generation until one or more of the following occur:

(i) a second key of the asymmetric key pair is compromised, where the second key is required to decrypt data encrypted with the first key, or (ii) the first key is disclosed beyond the remote apparatus, or (iii) another asymmetric key pair is generated.

17. The device of claim 12, wherein another asymmetric key pair is generated for policy or procedural reasons.

18. A method comprising:

at a remote apparatus:

(A) obtaining a key-encrypting key, the key-encrypting key being a first key of an asymmetric key pair;

(B) generating a symmetric encryption key;

(C) determining a key control block, the key control block comprising the symmetric encryption key and a sequence field;

(D) encrypting the key control block using the key-encrypting key to form an encrypted key control block;

(E) storing the encrypted key control block in a recording file;

(F) storing an encrypted dataset in the recording file, wherein the encrypted dataset comprises a dataset encrypted using the symmetric encryption key; and (G) repeating act (F) until: (i) a predetermined time has elapsed since the recording file was opened, or (ii) a predetermined amount of data has been written to the recording file, and then (H) closing the recording file and purging the symmetric encryption key; and then (I) repeating acts (B) to (H) at least once, wherein, in step (I):

(x) a repetition of step (B) generates another symmetric encryption key, and (y) repetition of step (C) uses the other symmetric encryption key and another sequence field, distinct from a previous sequence field, and (z) a repetition of step (E) uses another recording file, distinct from a previous recording file, wherein a value of an initial sequence field is randomly generated by the remote apparatus, and wherein the remote apparatus increments the sequence field for each successive recording file created by the remote apparatus, and wherein the sequence field indicates a place of the recording file in a recording order of a plurality of recording files, and wherein data in the dataset comprise one or more of: video data, telemetry data, instrumentation data, image data, audio data, flight data, metadata, keyboard data, and other forms of time series data, wherein the recording file is closed upon the remote apparatus powering off, the method further comprising, upon the remote apparatus powering on:

forming a new encrypted key control block by: step (B) generating a new symmetric encryption key, and step (C) determining a new key control block, comprising the new symmetric encryption key and a new sequence field, and step (D) encrypting the new key control block using the key-encrypting key to form the new encrypted key control block, and wherein a plurality of sequence fields of a corresponding plurality of key control blocks of a plurality of recording files is used to determine if the remote apparatus was restarted.

\* \* \* \* \*